(12) United States Patent
Simos

(10) Patent No.: US 11,627,735 B2
(45) Date of Patent: Apr. 18, 2023

(54) FISHHOOK REMOVER

(71) Applicant: Timotheos G. Simos, Fort Pierce, FL (US)

(72) Inventor: Timotheos G. Simos, Fort Pierce, FL (US)

( * ) Notice: Subject to any disclaimer, the term of this patent is extended or adjusted under 35 U.S.C. 154(b) by 452 days.

(21) Appl. No.: 16/796,643

(22) Filed: Feb. 20, 2020

(65) Prior Publication Data

US 2020/0260711 A1 Aug. 20, 2020

Related U.S. Application Data

(60) Provisional application No. 62/807,952, filed on Feb. 20, 2019.

(51) Int. Cl.
*A01K 97/18* (2006.01)
*B25B 7/02* (2006.01)
*B25B 7/22* (2006.01)

(52) U.S. Cl.
CPC ............... *A01K 97/18* (2013.01); *B25B 7/02* (2013.01); *B25B 7/22* (2013.01)

(58) Field of Classification Search
CPC ........ A01K 69/00; A01K 97/00; A01K 97/16; A01K 97/18; B25B 7/00; B25B 7/02; B25B 7/22; B25F 1/00
See application file for complete search history.

(56) References Cited

U.S. PATENT DOCUMENTS

| | | | | |
|---|---|---|---|---|
| 1,795,054 A | * | 3/1931 | Summers | B25B 23/10 81/421 |
| 2,220,317 A | * | 11/1940 | Cynoske | B25C 11/02 29/248 |
| 3,597,775 A | * | 8/1971 | McCasland | A01K 95/02 72/409.13 |
| 4,208,749 A | * | 6/1980 | Hermann | A01K 95/02 7/106 |
| 4,796,318 A | * | 1/1989 | Bigej | B25B 7/02 7/106 |
| 4,899,482 A | * | 2/1990 | Gerdes | A01K 97/00 43/4 |
| 5,797,927 A | * | 8/1998 | Yoon | A61B 17/0469 606/139 |
| 5,850,649 A | * | 12/1998 | Simpson | A01K 97/00 7/106 |

(Continued)

*Primary Examiner* — Robert J Scruggs
(74) *Attorney, Agent, or Firm* — Nolan IP Law; Jason M. Nolan

(57) ABSTRACT

A fishhook remover for dehooking a fishhook from a catch is provided. The fishhook remover includes a first jaw and a second jaw, wherein the first jaw has a needle for engaging an eye of the fishhook, the needle projecting from a surface of the first jaw toward an opposing surface of the second jaw; wherein the second jaw has an opening on the opposing surface that is configured to receive the needle. The first and second jaws are operatively coupled to move between an open position where the first and second jaws are separated by a maximum distance possible and the eye of the fishhook can fit over the needle, and a closed position where the first and second jaws are at their closest approach to one another and the needle contacts the second jaw to securely retain the fishhook between the first and second jaws.

19 Claims, 6 Drawing Sheets

(56) References Cited

U.S. PATENT DOCUMENTS

| | | | | |
|---|---|---|---|---|
| 7,716,768 B2* | 5/2010 | Higgins | ................. | B25B 7/22 |
| | | | | 7/106 |
| 2012/0284997 A1* | 11/2012 | Morin | ................. | H01R 11/14 |
| | | | | 294/174 |
| 2016/0184980 A1* | 6/2016 | Takasaki | ................. | B25B 7/02 |
| | | | | 81/424.5 |

* cited by examiner

FISHHOOK REMOVER

CROSS-REFERENCE TO RELATED APPLICATIONS

This application claims the benefit of priority under 35 U.S.C. § 119(e) of U.S. Provisional Application Ser. No. 62/807,952; filed on Feb. 20, 2019; the content of which is relied upon and incorporated herein by reference in its entirety.

BACKGROUND

Anglers use a variety of fishhooks to catch fish, including J-hooks, circle-hooks, and treble hooks. Depending on the fishhook and the technique used to secure the fishhook to the fish, the fishhook may be in the fish's mouth (e.g., lip), gill, or, if swallowed, in the throat or stomach. Removal of the fishhook can be very difficult and dangerous. Dehooking the fish can also cause damage to the fish's lip, gill, and/or organs.

SUMMARY

In various embodiments, a fishhook remover for removing/dehooking a fishhook from a catch is provided. In some embodiments, the fishhook remover comprises: a first jaw and a second jaw, each comprising a first end and a second end; wherein the first jaw comprises a needle for engaging an eye of the fishhook, the needle projecting from a surface of the first jaw toward an opposing surface of the second jaw; wherein the second jaw comprises an opening on the opposing surface that is configured to receive the needle; wherein the first and second jaws are operatively coupled to move between an open position where the first and second jaws are separated by a maximum distance possible and the eye of the fishhook can fit over the needle, and a closed position where the first and second jaws are at their closest approach to one another and the needle contacts the second jaw to securely retain the fishhook between the first and second jaws.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION OF THE INVENTION

Figure 1:
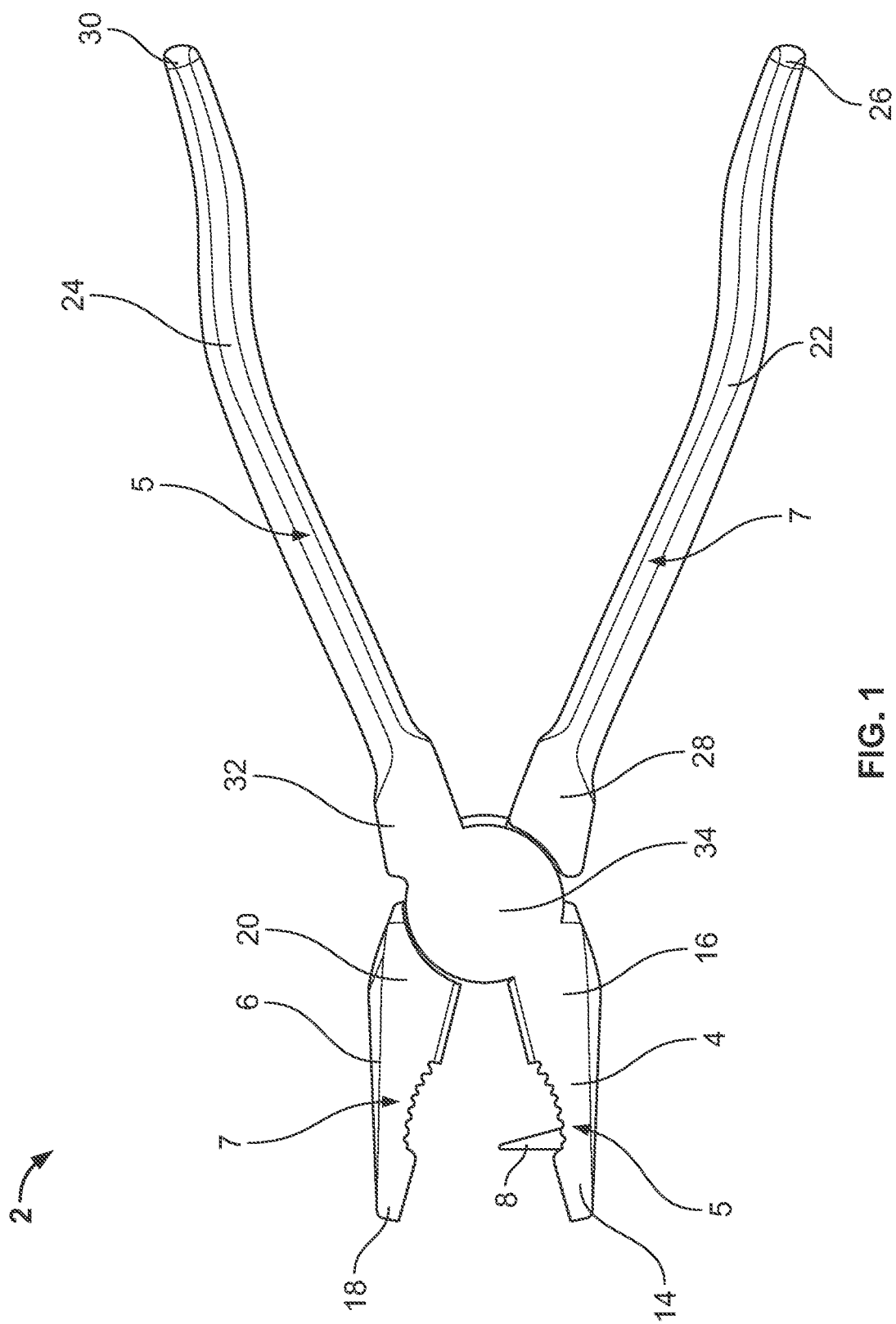
FIG. 1 is a side view of a fishhook remover in an open position, in accordance with some embodiments described herein.

The description of the sample embodiments is intended to be read in connection with the accompanying drawings, which are to be considered part of the entire written description of this invention. The figures are not necessarily drawn to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

In various embodiments, a fishhook remover for removing/dehooking a fishhook from a catch (living or non-living) or an inanimate object (e.g., seat cushion, rope, net, clothes, trash, etc.) is provided. FIGS. 1-8 illustrate various embodiments and features of such fishhook removers (2). The fishhook remover (2), also known as a dehooker, includes a first jaw (4), a second jaw (6), and a needle (8) for engaging the various parts of a fishhook (F), including, e.g., the eye, shank, bend, barb, or point. In some embodiments, the needle (8) engages the eye (E) of the fishhook (F). In some embodiments, the needle (8) projects from a surface (10) of the first jaw (4) toward an opposing surface (12) of the second jaw (6). In some embodiments, the second jaw (6) comprises an opening (38) on the opposing surface (12) that is configured to receive the needle (8). The first and second jaws (4, 6) are operatively coupled to move between an open position where the first and second jaws are separated by a maximum distance possible, and a closed position where the first and second jaws (4, 6) are at their closest approach to one another. In some embodiments, in the open position, the eye (E) of the fishhook (F) can fit over the needle (8). In some embodiments, in the closed position, the needle (8) contacts the second jaw (6) to securely retain the fishhook (F) between the first and second jaws (4, 6).

Figure 2:
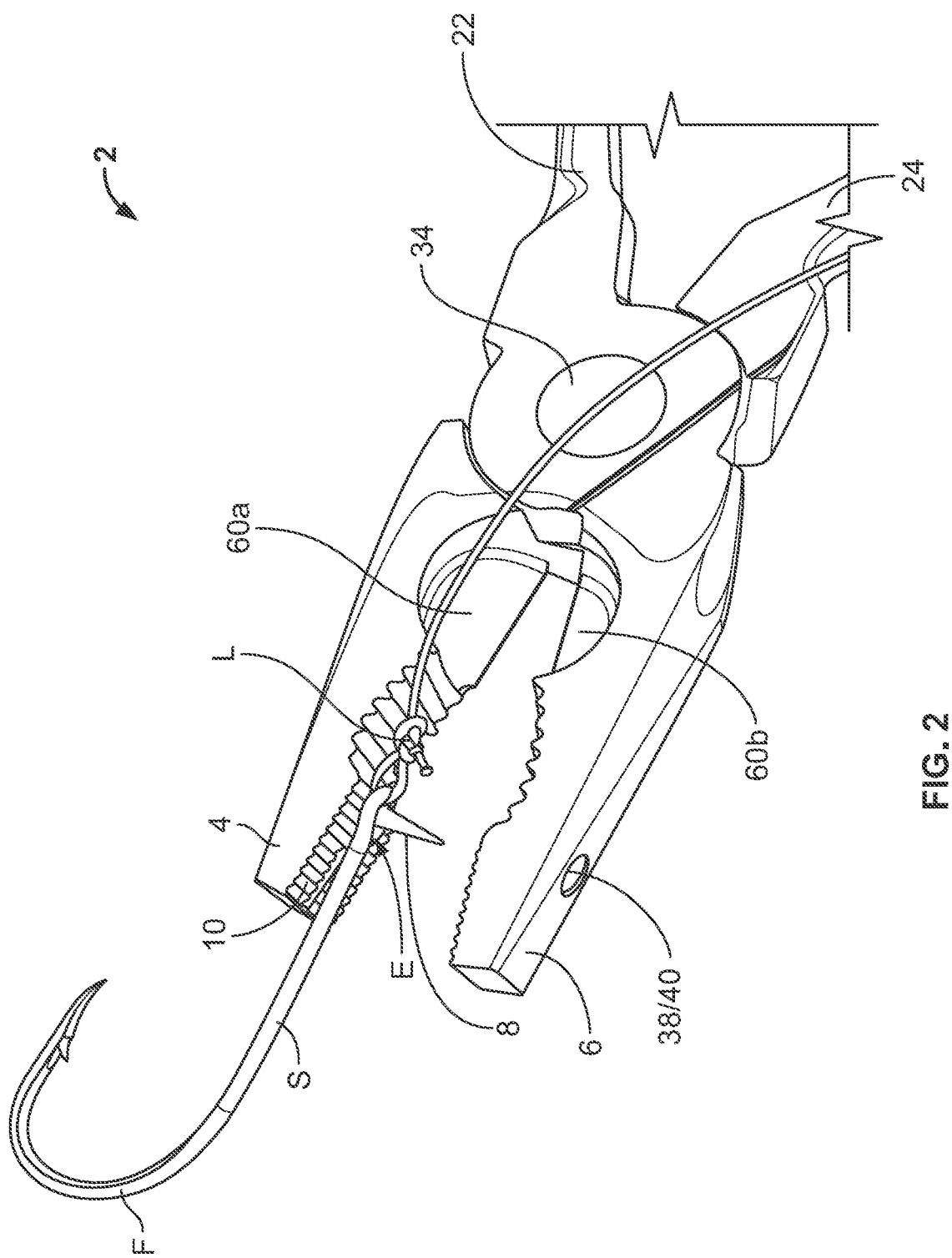
FIG. 2 is a partial perspective side view of the fishhook remover engaging a fishhook in an open position, in accordance with some embodiments described herein.
Figure 3:
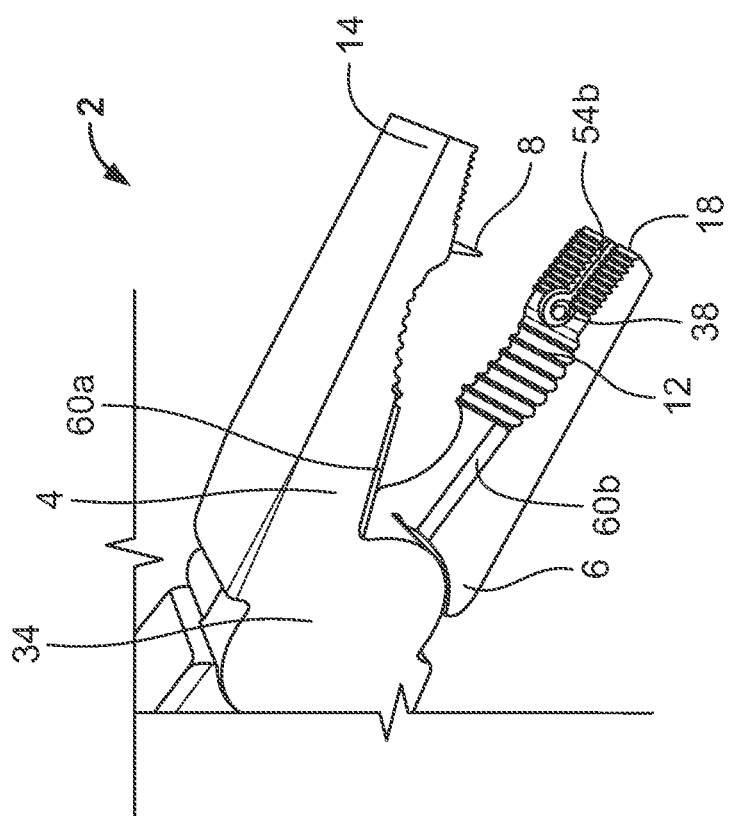
FIG. 3 is a partial perspective side view of the fishhook remover in an open position, in accordance with some embodiments described herein.
Figure 4:
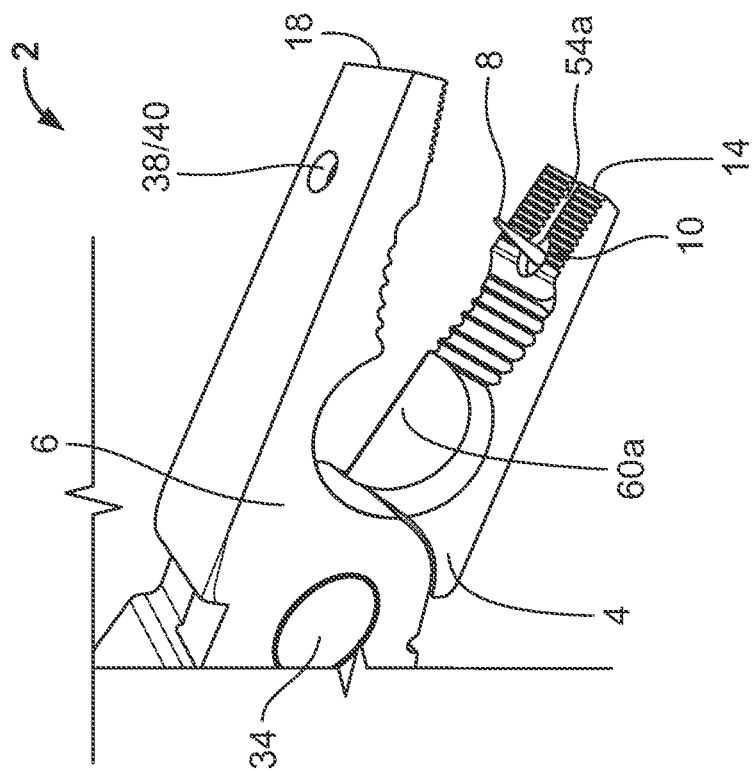
FIG. 4 is a partial perspective side view of the fishhook remover in an open position, in accordance with some embodiments described herein.
Figure 5:
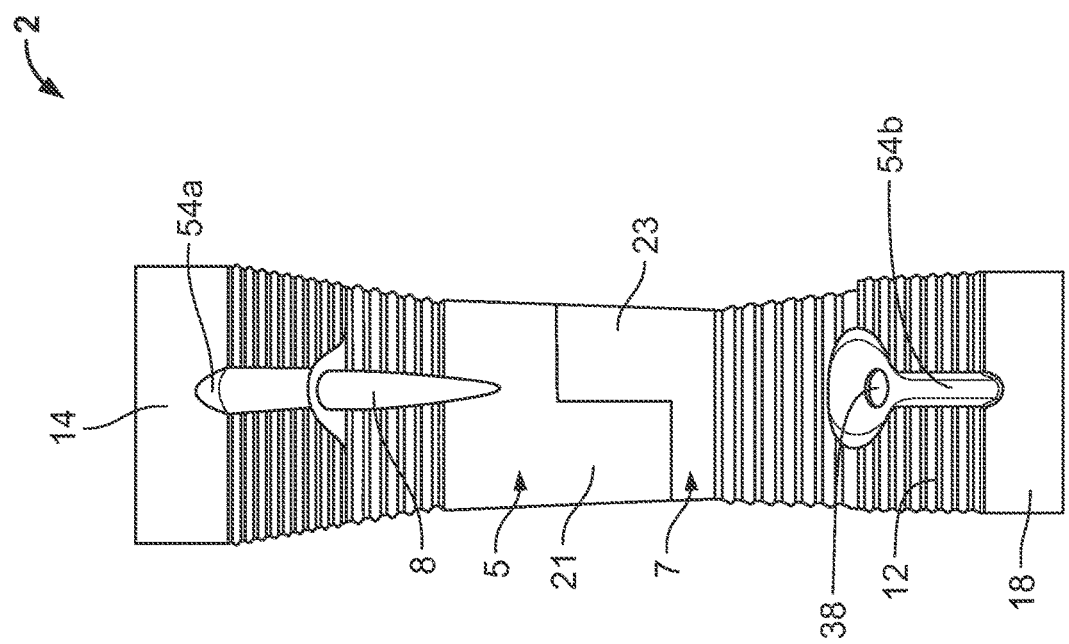
FIG. 5 is a front view of the fishhook remover in an open position, in accordance with some embodiments described herein.
Figure 6:
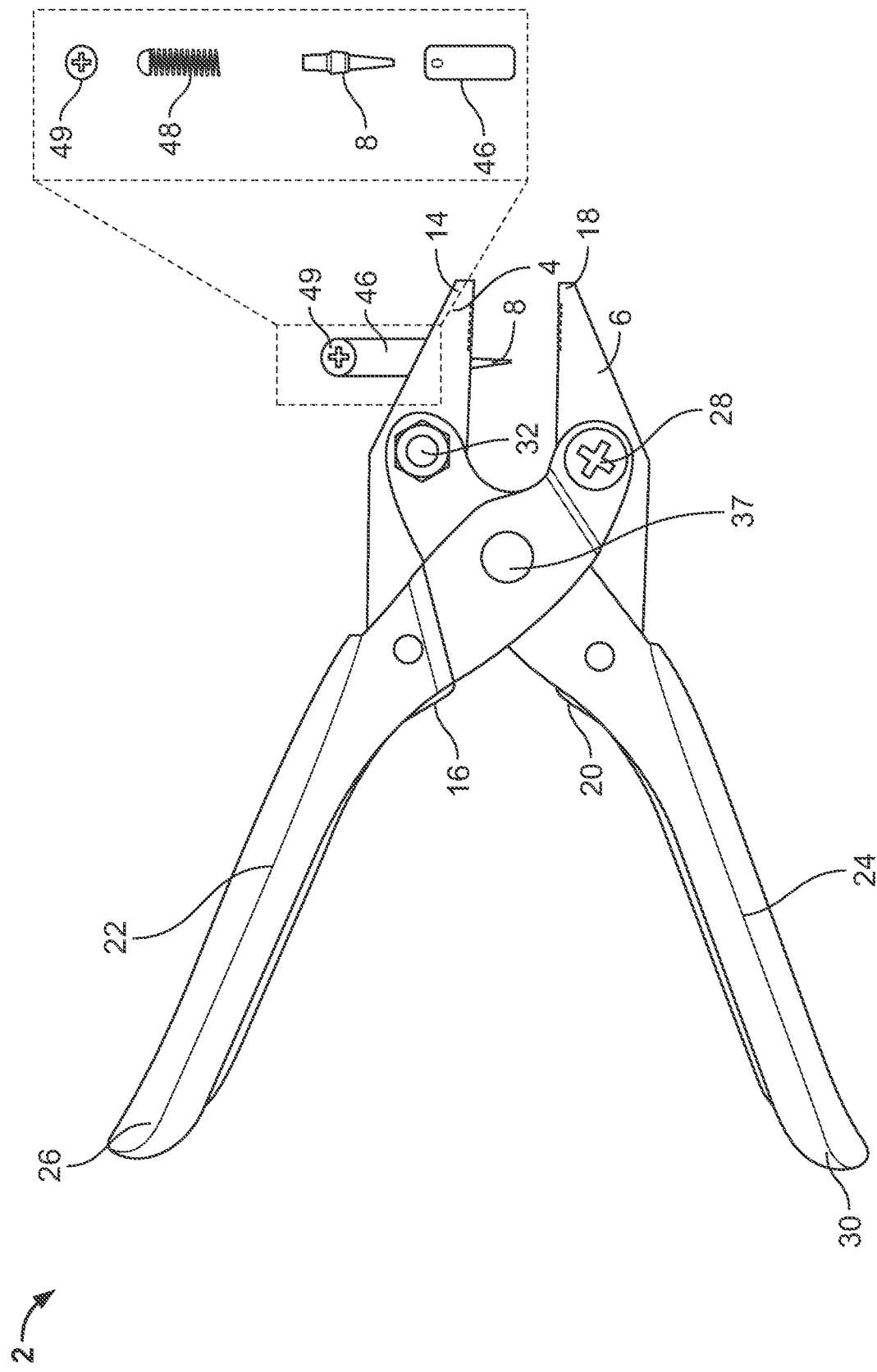
FIG. 6 is a side view of a fishhook remover in an open position, in accordance with some embodiments described herein.

In some embodiments, for example, as shown in FIGS. 1 and 6, the first jaw (4) includes a first end (14) and a second end (16), and the second jaw (6) includes a first end (18) and a second end (20). In some embodiments, the fishhook remover (2) includes a first handle (22) and a second handle (24). In some embodiments, the first handle (22) includes a first end (26) and a second end (28), and the second handle (24) includes a first end (30) and a second end (32). In some embodiments, as shown in FIGS. 1-8, the second end (28) of the first handle (22) is directly attached to the second end (20) of the second jaw (6) to form a single piece, and the second end (32) of the second handle (24) is directly attached to the second end (16) of the first jaw (4) to form a single piece. In some embodiments, the fishhook remover (2) includes a joint (34) that pivotably couples the two pieces. In some embodiments, the fishhook remover (2) includes a joint (34) that pivotably couples the first handle (22) to the second handle (24). In such embodiments, when the handles (22, 24) are moved away from each other, the jaws (4, 6) are moved about the joint (34) toward the open position, and when the handles (22, 24) are moved toward each other, the jaws (4, 6) are moved about the joint (34) toward the closed position. In some embodiments, as shown in FIGS. 1, 3, and 5, the handles (22, 24) are longer in length than the jaws (4, 6). In such embodiments, the joint (34) is positioned to provide a leveraged force between the jaws (4, 6) that is adequate to securely retain a fishhook (F) when the fishhook remover (2) is in the closed position.

Figure 8:
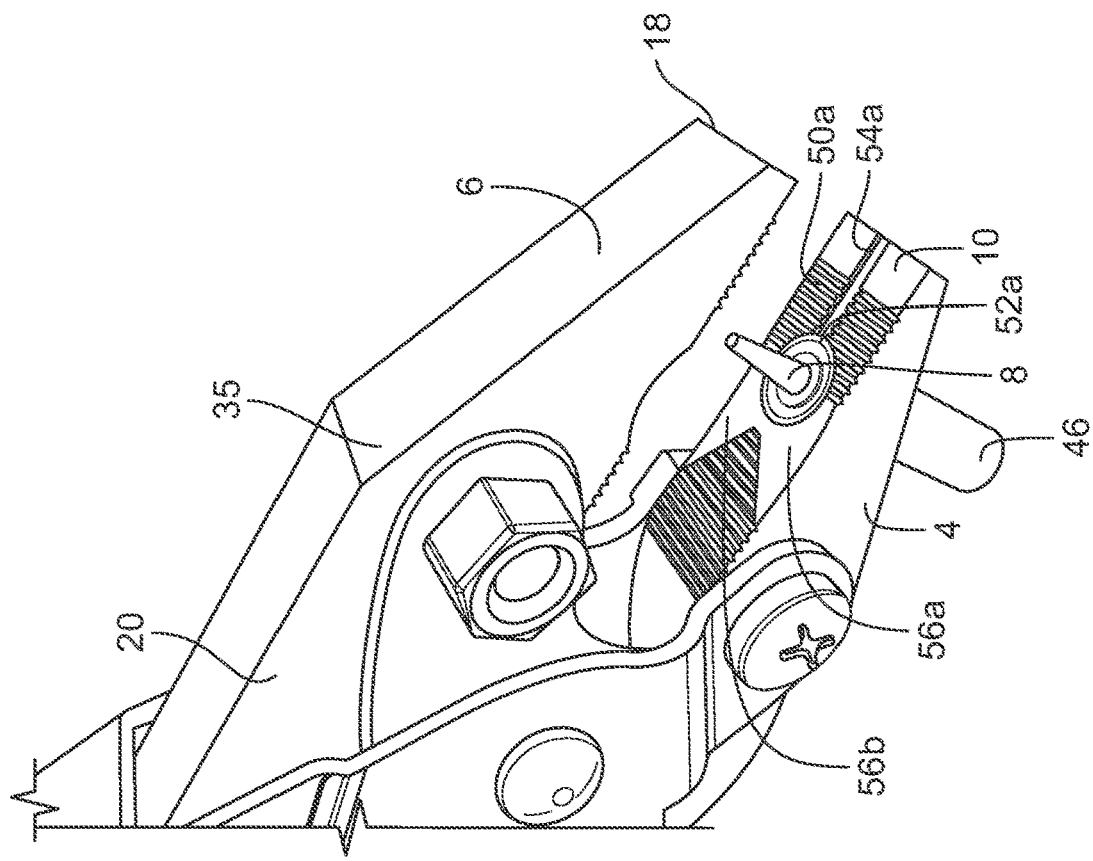
FIG. 8 is a partial, bottom perspective view of the fishhook remover in an open position, in accordance with some embodiments described herein.
Figure 7:
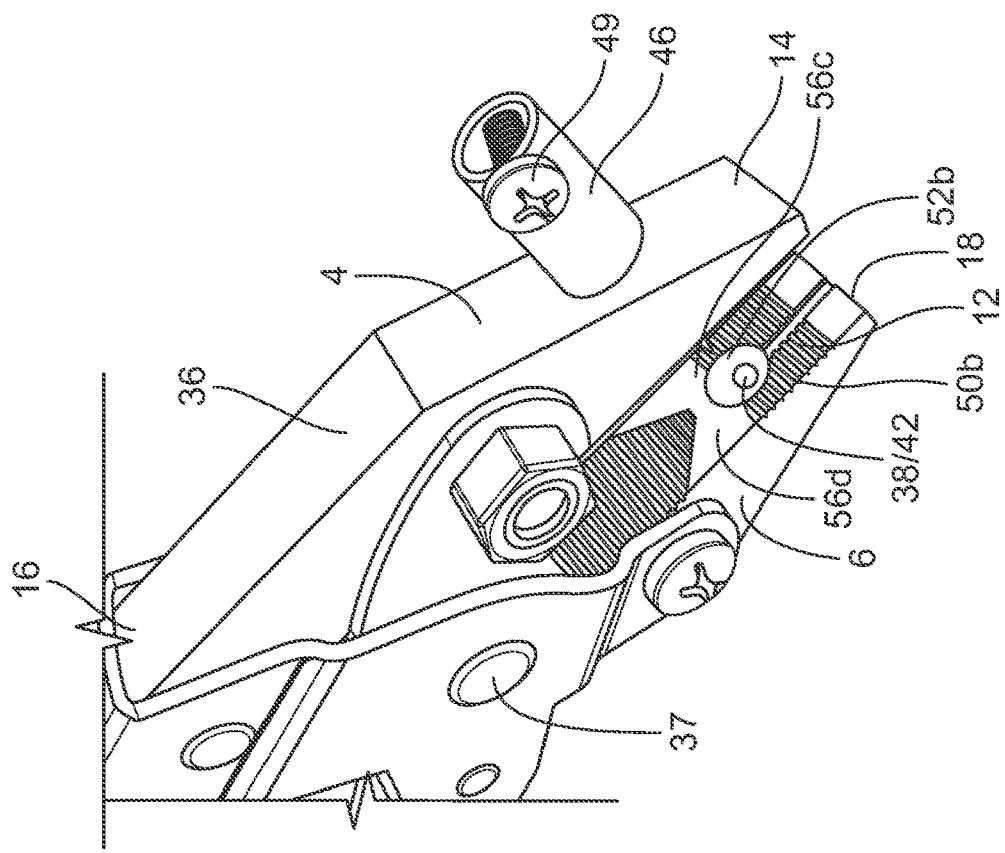
FIG. 7 is a partial, top perspective view of the fishhook remover in an open position, in accordance with some embodiments described herein.

In some embodiments, as shown in FIG. 1, the fishhook remover (2) includes a first plier element (5) and a second plier element (7). In such embodiments, the first plier element (5) comprises the first jaw (4) and the second handle (24), and the second plier element (7) comprises the second jaw (6) and the first handle (22). In some embodiments, the first plier element (5) is a first unitary piece of material, and the second plier element (7) is a second unitary piece of material. In some embodiments, the first and second plier elements (5, 7) are comprised of a plurality of pieces of material. For example, as shown in FIGS. 6-8, the first jaw (4), the second jaw (6), the first handle (22), and the second handle (24) are each separate pieces of material that are assembled into the first and second plier elements (5, 7). In some embodiments, the fishhook remover (2) includes a joint (34) that pivotably couples the first and second plier elements (5, 7) together.

In some embodiments, the first plier element (5) has a shape that is complementary to the shape of the second plier element (7) so that they can be coupled by the joint (34). For example, as shown in FIGS. 1-8, the first plier element (5) and second plier element (7) have complementary shapes for being joined together. In such embodiments, as shown in FIG. 5, the first plier element (5) includes a first coupling area (21) located between the first jaw (4) and the second handle (24) that is configured to pivotably couple to a second coupling area (23) on the second plier element (7), which is located between the second jaw (6) and the first handle (22) and configured to receive the coupling area (21). In such embodiments, the joint (34) pivotably couples the first and second plier elements (5, 7) at the complementary coupling areas (21, 23).

In some embodiments, as shown in FIGS. 6-8, the first handle (22) and the second handle (24) are each attached to both of the first and second jaws (4, 6). In such embodiments, the first handle (22) is attached to the second end (16) of the first jaw (4) and to a middle area (35) of the second jaw (6). In such embodiments, the second handle (24) is attached to the second end (20) of the second jaw (6) and to a middle area (36) of the first jaw (4). In such embodiments, the first and second handles (22, 24) are pivotably coupled with a fastener (37) (e.g., rivet, pin, etc.) or a pair of fasteners on both the first and second jaws (4, 6) to provide a parallel action device (i.e., opposing surfaces of the first and second jaws (4, 6) remain parallel with each other as they are moved between the open and closed positions).

In some embodiments, the needle (8) projects from a position on the surface (10) of the first jaw (4) that is spaced longitudinally apart from the first end (14) of the first jaw (4). For example, as shown in FIGS. 1-8, the needle (8) is a spaced distance (e.g., several millimeters, such as 1-30 mm, 2-25 mm, 5-20 mm, etc.) from the first end (14) of the first jaw (4). In some embodiments, the needle (8) is set back from the first end (14) to provide an area for the first and second jaws (4, 6) to securely retain the shank (S) of a fishhook (F) while the needle (8) is engaged with the eye (E) of the fishhook (F). For example, as shown in FIG. 2, the fishhook (F) can be securely retained between the first and second jaws (4, 6). In such embodiments, the fishhook (F) extends outwardly from the needle (8) past the first ends (14, 18) of the first and second jaws (4, 6).

In some embodiments, the needle (8) is adapted to pass through the eye of a fishhook. In some embodiments, the needle (8) is a cylinder or rod. In some embodiments, the needle (8) has a blunt tip. In other embodiments, the needle (8) has a tapered tip. In some embodiments, the needle (8) has a tapered and blunt tip. In some embodiments, the portion of the needle (8) projecting from the first jaw (4) is tapered (e.g., conical). In such embodiments, the taper and/or outer circumference of the needle (8) can be any suitable degree and gauge, respectively, based on the gauge of the opening/eye (E) of the fishhook (F). In some embodiments, as shown in FIGS. 1-8 for example, the needle (8) is sharply tapered toward its tip and has a relatively small outer circumference at the base area closest to the surface (10). In some embodiments, for example, the needle (8) is relatively less tapered toward its tip and has a relatively wide large outer circumference at the area closest to the surface (10).

In some embodiments, the needle (8) is static and fixed to the first jaw (4). For example, as shown in FIGS. 1-5, the needle (8) can project from the surface (10) and have a fixed length, with respect to the distance from its tip to the surface (10), when the jaws are in the open or closed position. In some embodiments, the second jaw (6) can include an opening (38) configured to receive the needle (8). For example, as shown in FIGS. 2, 4, 5, and 7, the opening (38) in the second jaw (6) can be an indentation, recess, cavity (e.g., cylindrical cavity), or a through-hole (40) configured for the needle (8) to enter and pass partially or substantially through, depending on the length of the needle (8), when the first and second jaws (4, 6) are in the closed position. In some embodiments, the opening (38) is spaced longitudinally apart from the first end (18) of the second jaw (6). In such embodiments, the opening (38) is positioned along the second jaw (6) in order to receive the fishhook alignment needle (8) on the first jaw (4). For example, the opening (38) and the needle (8) are a spaced distance (e.g., several millimeters, such as 1-30 mm, 2-25 mm, 3-20 mm, 5-10 mm, etc.) from the first end (18) of the second jaw (6) and the first jaw (4), respectively.

In some embodiments, the needle (8) is upwardly moveable with respect to the surface (10) of the first jaw (4). For example, as shown in FIGS. 6-8, in some embodiments the needle (8) moves (e.g., retracts) within the housing (46) attached to the outer surface (11) of the first jaw (4) when the first and second jaws (4, 6) are in or moving toward a closed position. In some embodiments, the opposing surface (12) of the second jaw (6) includes an opening (38) that is configured to receive a portion of the needle (8). In such embodiments, the opening (38) is a recess or cavity, as opposed to a through-hole. In some embodiments, the housing (46) includes a biasing mechanism (e.g., spring) (48) adapted to push the needle (8) out from the surface (10) of the first jaw (4) when no counter-force is present. In such embodiments, the fishhook alignment needle (8) projects further out from the surface when the first and second jaws (4, 6) are in an open position (e.g., FIG. 6) than when the first and second jaws (4, 6) are in a closed position. In such embodiments, the housing (46) can include a fastener (49) for retaining the mechanism (48) and needle (8) in the housing (46). For example, as shown in the inset of FIG. 6, the spring (48) is configured to receive a portion of the needle (8), and the housing (46) is configured to receive the needle (8), spring (48), and the fastener is a screw (49). In some embodiments, as shown in FIGS. 6 and 7, the screw (49) can be set from the side of the housing (46) to retain the spring (48). In some embodiments, the fastener (49) can be a removable pin or threaded screw cap instead of a set screw. In such embodiments, the threaded screw cap an include a hole that allows water to drain out.

In some embodiments, as shown in FIG. 7, the opening (38) is a cavity (42) having a floor and the opening is configured for the needle (8) to enter into but not pass therethrough when the first and second jaws (4, 6) are in the closed position. In such embodiments, the floor is positioned deep enough into the second jaw (6) for the opening (38) to receive the needle (8) so that the eye (E) of the fishhook (F) is securely retained and controlled when the first and second jaws (4, 6) are in or are approaching the closed position. For example, as shown in FIG. 8, in some embodiments the outer surface of the second jaw (6) does not have a through-hole corresponding to the cavity (38/42) and needle (8).

As shown in FIGS. 7 and 8, in some embodiments the surface (10) of the first jaw (4) and/or the opposing surface (12) of the second jaw (6) includes a gripping portion (50a, 50b). In such embodiments, the gripping portions (50a, 50b) can include a plurality of laterally oriented channels that provide a textured surface for gripping a fishhook. The laterally oriented channels also allow water to escape while the first and second jaws (4, 6) are in a closed position.

In some embodiments, as shown in FIGS. 7 and 8, the surface (10) of the first jaw (4) and/or the opposing surface (12) of the second jaw (6) includes an eye (E) retention recess (52a, 52b). In some embodiments, for example, the eye retention recess can be an annular depression. In such embodiments, the eye retention recess (52a) on the first jaw (4) surrounds the needle (8) and is configured to receive the eye (E) of a fishhook (F). In such embodiments, the eye retention recess (52b) on the second jaw (6) surrounds the opening (38) and is also configured to receive the eye (E) of the fishhook (F). In such embodiments, because the eye retention recesses (52a, 52b) can securely receive the eye (E) of the fishhook (F) when the fishhook remover (2) is in the closed position, the shank (S) of the fishhook (F) will be more securely retained between the first jaw (4) and the second jaw (6). In some embodiments, the eye retention recess (52b) is the opening (38) (i.e., the recess is serves as both).

In some embodiments, as shown in FIGS. 2-5, 7, and 8, the surface (10) of the first jaw (4) and/or the opposing surface (12) of the second jaw (6) includes an elongated longitudinal channel (54a and/or 54b) configured to receive a shank (S) of the fishhook (F). In such embodiments, the first and second channels (54a, 54b) are aligned with the needle (8). For example, the needle (8) and the first and second channels (54a, 54b) can be centered with respect to lateral edges of the surfaces (10, 12). In such embodiments, the channels (54a, 54b) traverse the surfaces (10, 12) in a longitudinal direction from the first ends (14, 18) of the first and second jaws (4, 6) toward the needle (8) and opening (38), respectively. In some embodiments, the channels (54a, 54b) and the eye retention recesses (52a, 52b) are depressions having about the same depth from the surfaces (10, 12) of the first and second jaws (4, 6). In such embodiments, the channels (54a, 54b) provide an additional control for securely retaining the shank (S) of the fishhook (F) between the surface (10) of the first jaw (4) and the surface (12) of the second jaw (6). In some embodiments, the channels (54a, 54b) are configured to align the shank of the fishhook (F) in a direction that is parallel to or substantially parallel to the first and second jaws (4, 6). The shape of the channels (54a, 54b) can be any suitable shape for receiving and securing the shank of the fishhook. In some embodiments, the channels (54a, 54b) have a semi-circular shape, a V-shape, or a modified combination thereof.

In some embodiments, as shown in FIGS. 7 and 8, the surface (10) of the first jaw (4) includes a third and/or fourth channel/recess (56a, 56b) extending from the eye retention recess (52a) toward a lateral edge of the first jaw (4). In some embodiments, the opposing surface (12) of the second jaw (6) includes a fifth and/or sixth channel/recess (56c, 56d) extending from the eye retention recess (52b) toward a lateral edge of the second jaw (6). In some embodiments, the third and/or fourth channels (56a, 56b) and the fifth and/or sixth channels (56c, 56d) are positioned on complementary locations of the surface (10) and opposing surface (12), respectively, and are configured to receive a fishing line or leader (L) attached to the eye (E) of the fishhook (F). In some embodiments, the third recess (56a), fourth recess (56b), fifth recess (56c), and/or sixth recess (56d) are configured to receive a specific portion (e.g. a portion including the shank, bend, barb, point) of the fishhook (F). For example, in some embodiments, the fishhook remover (2) can engage the fishhook (F) from the shank and/or bend (i.e., parts other than the eye (E)). In some embodiments, one or more of the recesses 56a, 56b, 56c, and 56d is configured to align the shank or bend of the fishhook (F) in a direction that is transverse (not parallel) to the first and second jaws (4, 6). In such embodiments, the shank and/or bend of the fishhook can be secured between the first and second jaws (4, 6) at a position between the needle (8) and joint (34) of the fishhook remover (2). Engaging the fishhook (F) in such a manner will prevent the fishhook from being pulled out of the jaws (4, 6) from the first ends (14, 18), while adequate gripping pressure can prevent the fishhook from being pulled out laterally.

In such embodiments, when the fishhook remover (2) is in the closed position, the shank (S) of the fishhook (F) will be more securely retained between the surface (10) of the first jaw (4) and the surface (12) of the second jaw (6) because there will be a smaller or no gap between the first and second jaws (4, 6). In such embodiments, the fishing line or leader (L) can be received in a channel on either lateral side of the first and second jaws (4, 6) before the fishhook remover (2) is moved to the closed position.

In some embodiments, the fishhook remover (2) has a biasing member (e.g., spring) between the first and second jaws (4, 6) or between the first and second handles (22, 24). In some embodiments, the biasing member can be any suitable type of spring. For example, the spring can be a helical compression, or coil spring; or a leaf spring. When the spring is located between the first and second handles (22, 24), the spring pushes the jaws (4, 6) and handles (22, 24) apart to establish and maintain the open position as the default position. When the spring is located between the jaws (4, 6), the spring pushes the jaws (4, 6) and handles (22, 24) apart to establish and maintain the open position as the default position. Accordingly, when the fishhook remover (2) is in the closed position, and the user releases compressive force on the handles, the biasing member (e.g., spring) will force the jaws (4, 6) to the open position. In some embodiments, opposing surfaces of the handles (22, 24) or jaws (4, 6) includes a cavity configured to receive one end of a coil spring.

In some embodiments, the fishhook remover (2) includes a trigger-shaped element that projects from an outside surface of at least one of the handles. The trigger-shaped element can be, for example, a partial or full loop, or any suitable shape that is configured to receive one of the user's fingers during use of the fishhook remover (2). In some embodiments, the trigger-shaped element projects from handle (24) of the first plier element (5). In such embodiments, the user's index finger can be used to grip the trigger-shaped element while the needle (8) engages the eye of a fishhook. When the jaws (4, 6) are in the closed position, the trigger-shaped element provides the user with a surface to pull on while removing the fishhook from the catch's (e.g., fish, shark, turtle, bird) mouth or body part.

In some embodiments, the fishhook remover (2) includes cutting element configured to cut a fishing line or leader associated with the fishing line. In some embodiments, the cutting element comprises a pair of complementary blades. In some embodiments, the complementary blades are incorporated into one of the first and second jaws (4, 6). In such embodiments, when the jaws are in the open position, the cutting element is also in an open position, and when the jaws are in the closed position, the cutting element is also in a closed position. In such embodiments, as the first and second jaws (4, 6) approach the closed position (i.e., when the first and second handles (22, 24) are actuated), the fishing line or leader can be inserted between the cutter blades and with adequate pressure the line will be cut.

The fishhook remover (2) can optionally include a locking mechanism. In some embodiments, the fishhook remover (2) is adapted to include a locking mechanism from locking pliers (e.g., Vise-Grips). In such embodiments, the locking mechanism can include a bolt attached to one of the first and second handles (22, 24), a lever attached to the other handle, and a linking member pivotably connected to the bolt and the lever-containing handle. The bolt is configured to adjust the spacing between the first and second jaws (4, 6) when locked, and the lever is configured to push the handles apart in order to unlock the jaws. When the fishhook remover (2) is in the closed position, the first and second handles (22, 24) remain locked in place, and the lever is separated slightly from the handle it is housed in. The user can push the lever down to actuate the linking member and release the lock and the fishhook remover (2) from the closed position.

In some embodiments, the locking mechanism is a swingable latch that is attached to the first handle (22) and be adapted to pivot toward the second handle (24), or attached to the second handle (24) and be adapted to pivot toward the first handle (22). In such embodiments, the swingable latch is configured with an elongated "C" shape in which the two ends on the open side are attached to one of the handles, and the closed side is wide enough to accommodate/receive the second handle (24) when the fishhook remover (2) is in use. In some embodiments, the second handle (24) includes a lip or indented area for receiving and retaining the swingable latch.

In some embodiments, the fishhook remover (2) includes a gripping surface on the first handle (22), the second handle (24), or both handles. In such embodiments, the gripping surface can be made out of any suitable material or textured surface (e.g., polymer).

In some embodiments, the fishhook remover (2) includes a sharpening surface for sharpening an edge (e.g., the point hook of a fishhook). In such embodiments, the sharpening surface can be included on a side, top, or other surface of the first or second jaws (4, 6) or a side surface of the first or second handles (22, 24). In some embodiments, the fishhook remover (2) includes a crimping element. In such embodiments, the crimping element can be included on the first and second jaws (4, 6), either as symmetrical semicircles or in a male/female arrangement.

The fishhook remover (2) according to the embodiments described herein can be used to remove a variety of fishhooks from a catch (e.g., fish), including J-hooks, circle-hooks, and treble hooks. As would be appreciated by one of ordinary skill in the art, the fishhook remover (2) can be utilized when a fish is in close proximity (e.g., a few inches to several feet). A user can remove the fishhook (F) by, e.g., separating the first and second jaws (4, 6) of the fishhook remover (2) to an open position so that the eye (E) of the fishhook can fit over the needle (8); inserting the needle (8) into the eye (B) of the fishhook; applying adequate pressure to the first and second handles (22, 24) so that the first and second jaws (4, 6) are at their closest approach to one another and the fishhook alignment needle contacts the second jaw to securely retain the fishhook between the first and second jaws in a closed position; and actuating the fishhook remover (2) to remove the fishhook (F) from the catch. The fishhook remover (2) can be held by the user with the first jaw (4) or the second jaw (6) as the top jaw with respect to the user's hand when engaging the fishhook. In contrast to conventional pliers, from which fishhook can slip off of, and which require substantial gripping pressure to maintain a fishhook between the jaws of the pliers, the fishhook remover (2) according to the embodiments described herein makes the removal of a fishhook unexpectedly easier and more efficient. During use, a fishhook (F) is locked between the jaws (4, 6) of the fishhook remover (2) because the needle (8), which is in contact with the second jaw (6), prevents the fishhook (F) from escaping. Accordingly, less gripping pressure is required. In addition, certain features of the fishhook remover (2), such as the eye retention recess (52a) on the first jaw (4) and the third and/or fourth channel/recess (56a, 56b), provide a gap between the jaws (4, 6) for the fishing line, leader, or knot connected to the eye of the fishhook. In contrast, conventional pliers damage those components during the removal of a fishhook from a catch. Further, the easier removal of a fishhook with the fishhook remover (2) according to the embodiments described herein causes significantly less damage to the fish compared to removal of a fishhook with conventional pliers or dehookers.

The foregoing is provided for purposes of illustrating, explaining, and describing embodiments of this invention. Modifications and adaptations to these embodiments will be apparent to those skilled in the art and may be made without departing from the scope or spirit of this invention.

Although the subject matter has been described in terms of exemplary embodiments, it is not limited thereto. Rather, the appended claims should be construed broadly, to include other variants and embodiments, which may be made by those skilled in the art.

The invention claimed is:

1. A fishhook remover for dehooking a fishhook from a catch, the fishhook remover comprising:
   a first jaw and a second jaw, each comprising a first end and a second end;
   wherein the first jaw comprises a needle for engaging an eye of the fishhook, the needle projecting from a surface of the first jaw toward an opposing surface of the second jaw;
   wherein the first jaw further comprises a first elongated channel on the surface of the first jaw that is configured to receive a shank of the fishhook, the first elongated channel being aligned with the needle and centered with respect to lateral edges of the first jaw and longitudinally positioned between the needle and the first end of the first jaw;
   wherein the opposing surface of the second jaw comprises an opening configured to receive the needle, the opening being circumferentially enclosed by the second jaw and positioned at a spaced distance from a first end of the second jaw;
   wherein the second jaw further comprises a second elongated channel on the opposing surface of the second jaw that is configured to receive the shank of the fishhook, the second elongated channel being aligned with the opening about a longitudinal axis of the fishhook remover and centered with respect to lateral edges of the second jaw and longitudinally positioned between the opening and the first end of the second jaw;
   wherein the first and second jaws are operatively coupled to move between an open position in which the first and second jaws are separated by a maximum distance possible and the eye of the fishhook is insertable between the second jaw and the needle, and a closed position in which the first and second jaws are at their closest approach to one another and the needle enters the opening of the second jaw to securely retain the fishhook between the first and second jaws; and
   wherein the first elongated channel and the second elongated channel are configured to securely retain the shank of the fishhook in a position aligned with the first and second jaws when the first and second jaws are in the closed position.

2. The fishhook remover of claim 1, wherein the opening on the opposing surface of the second jaw is a recess, an indentation, or a through-hole.

3. The fishhook remover of claim 1, wherein the needle is fixed to the first jaw, or moveable within the first jaw.

4. The fishhook remover of claim 3, wherein the needle is retractable within the first jaw, and wherein the first jaw further comprises a housing that receives the needle when the first and second jaws are in the closed position.

5. The fishhook remover of claim 4, wherein the housing comprises a biasing mechanism that pushes the needle outward from the housing and away from the surface of the first jaw when the fishhook remover is in the open position.

6. The fishhook remover of claim 5, wherein the housing further comprises a fastener that retains the biasing mechanism and needle in the housing.

7. The fishhook remover of claim 1, wherein the opening on the opposing surface of the second jaw is a recess, and the needle is retractable within the first jaw.

8. The fishhook remover of claim 1, wherein the opening on the opposing surface of the second jaw is a through-hole, and the needle is fixed to the first jaw.

9. The fishhook remover of claim 1, wherein the first jaw further comprises a first eye retention recess around the needle that is configured to receive the eye of the fishhook.

10. The fishhook remover of claim 9, wherein the second jaw further comprises a second eye retention recess around the opening that is configured to receive the eye of the fishhook.

11. The fishhook remover of claim 9, wherein the first elongated channel is longitudinally positioned between the first eye retention recess and the first end of the first jaw.

12. The fishhook remover of claim 1, wherein the needle projects from a position on the surface of the first jaw that is spaced apart from the first end.

13. The fishhook remover of claim 12, wherein the opening on the opposing surface of the second jaw is positioned to receive the needle.

14. The fishhook remover of claim 1, further comprising a recess on the surface of the first jaw, the recess being adjacent to the needle and opposite to the first end of the first jaw, the recess extending from a center area with respect to lateral edges of the first jaw, the center area including the needle, to the lateral edges of the first jaw, wherein the recess is configured to receive a fishing line or leader attached to the eye of the fishhook when the fishhook remover is in the closed position.

15. The fishhook remover of claim 1, further comprising a recess on the opposing surface of the second jaw, the recess being adjacent to the opening and opposite to the first end of the second jaw, the recess extending from a center area with respect to lateral edges of the second jaw, the center area including the opening, to the lateral edges of the second jaw, wherein the recess is configured to receive a fishing line or leader attached to the eye of the fishhook when the fishhook remover is in the closed position.

16. The fishhook remover of claim 1, further comprising a first handle and a second handle, wherein each of the first and second handles comprise a first end and a second end.

17. The fishhook remover of claim 16, further comprising a first plier element and a second plier element, wherein the first plier element comprises the first jaw and the second handle, and the second plier element comprises the second jaw and the first handle, and wherein a joint couples the first plier element and the second plier element.

18. The fishhook remover of claim 17, wherein the second end of the first handle is directly attached to the second end of the second jaw to form the second plier element, and the second end of the second handle is directly attached to the second end of the first jaw to form the first plier element; and wherein the first plier element comprises a first unitary material, and the second plier element comprises a second unitary material, wherein the joint couples the first and second unitary materials together.

19. The fishhook remover of claim 16, wherein the first handle is attached to the second end of the first jaw, and the second handle is attached to the second end of the second jaw; and wherein the second end of the first handle is attached to the second jaw, and the second end of the second handle is attached to the first jaw.

\* \* \* \* \*